US012643350B2

(12) United States Patent
Evans et al.

(10) Patent No.: US 12,643,350 B2
(45) Date of Patent: Jun. 2, 2026

(54) SYSTEMS, DEVICES AND METHODS FOR DYNAMICALLY LOGGING AND DISTRIBUTING TIRE PROFILE DATA

(71) Applicant: Cypress Semiconductor Corporation, San Jose, CA (US)

(72) Inventors: Bradley Evans, Northville, MI (US); Nicholas Stopher, White Lake, MI (US)

(73) Assignee: Infineon Technologies Americas Corp., El Segundo, CA (US)

( * ) Notice: Subject to any disclaimer, the term of this patent is extended or adjusted under 35 U.S.C. 154(b) by 209 days.

(21) Appl. No.: 18/393,168

(22) Filed: Dec. 21, 2023

(65) Prior Publication Data

US 2025/0206079 A1      Jun. 26, 2025

(51) Int. Cl.
*B60C 23/04* (2006.01)
*G07C 5/00* (2006.01)
(52) U.S. Cl.
CPC .......... *B60C 23/0457* (2013.01); *G07C 5/006* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 2021/0279995 A1* | 9/2021 | Muca | ...................... | G07F 9/023 |
| 2022/0017090 A1* | 1/2022 | Sams | .................... | B60C 11/246 |
| 2022/0207450 A1* | 6/2022 | Francis | ............... | G06F 16/2455 |
| 2023/0202247 A1* | 6/2023 | Henriet | ............... | B60C 23/0452 |
| | | | | 340/447 |
| 2023/0306378 A1* | 9/2023 | Teramoto | ............... | G06Q 50/40 |

* cited by examiner

*Primary Examiner* — Thomas S McCormack

(57) ABSTRACT

A method can include, wirelessly receiving tire information at a tire sensor device; acquiring sensor data with at least the tire sensor device; storing at least the tire information and sensor data in a tire profile data structure; periodically transmitting the tire profile data structure from the tire sensor device according to at least one wireless standard; and in response to changes in a state of the tire, updating the tire profile data structure; wherein the tire information identifies the tire. Corresponding devices and systems are also disclosed.

20 Claims, 11 Drawing Sheets

322

| Parameter | Date (e.g., timestamped) | |
|---|---|---|
| Tire Info | Mfg., Type, S/N | 322-0 |
| Manufactured | 3/1/2023 | 322-1 |
| Sold | 3/7/2023 Sell Date #2 | 322-2 |
| Vehicle | Make, Model, Year | 322-3 |
| Driver | Electronic ID | 322-4 |
| Wheel Revolutions | 12E7 | 322-5 |
| Jarring Events by Severity | 5,15, 200, 1000 | 322-6 |
| Current Tire Grade | B- | 322-7 |
| Estimated Tread | 4/32" | 322-8 |
| | | |

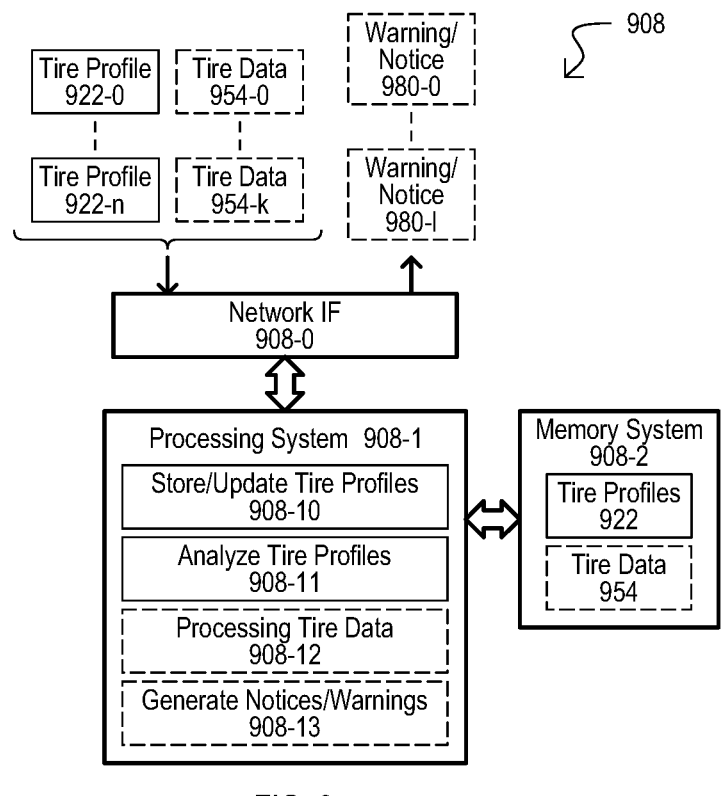
FIG. 9
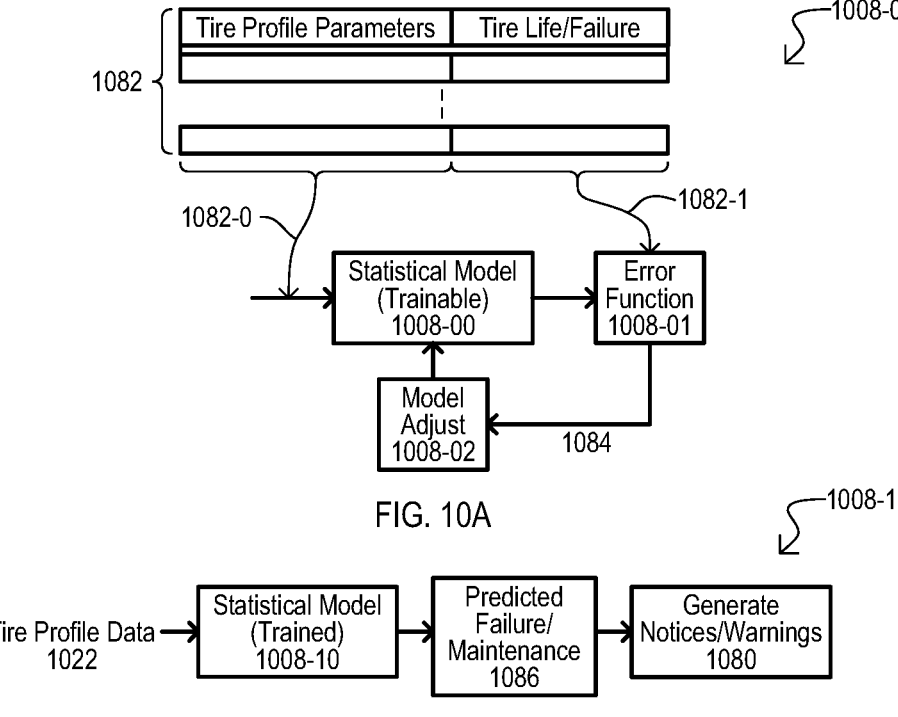
FIG. 10A
FIG. 10B

1190

1290

Establish Tire Profile Data Structure
1290-0

Receive BT Transmission
with Tire Information
1290-1

Read Tire Sensor Data
1290-2

Generate Other Profile Data from Sensor Data
1290-3

Populate Tire Profile Data Structure
with the Profile Data
1290-4

Upload Tire Profile to Other Vehicle System
1290-5

1390

SYSTEMS, DEVICES AND METHODS FOR DYNAMICALLY LOGGING AND DISTRIBUTING TIRE PROFILE DATA

TECHNICAL FIELD

The present disclosure relates generally to vehicle communication systems, and more particularly to generating, updating, and transmitting records for vehicle tires.

BACKGROUND

Vehicles can include tire a tire pressure monitoring system (TPMS) to monitor the pressure of tires. A conventional TPMS can include TPMS sensors mounted within each tire. TPMS sensors periodically generate tire pressure values and transmit them to a central TPMS receiver node. A conventional TPMS sensor includes an RF transmitter and LF receiver. The RF transmitter transmits tire pressure readings to a central TPMS node at a relatively high frequency (300-400 MHz). The LF receiver can receive input signals at a relatively low frequency (125 kHz). Tire pressure values received at a central node can be displayed to a driver and/or compared to predetermined limits to indicate when a low pressure state exists.

SUMMARY OF DISCLOSURE

Embodiments can include systems, devices and methods that can wirelessly receive tire information data at a tire sensor. Tire information can identify a tire. Sensor data can be acquired with a tire sensor. The tire information and other tire related data can be stored in a tire data structure. The tire data structure can be periodically transmitted from the tire sensor according to one or more wireless standards. In response to changes in a state of the tire, the tire profile data structure can be transmitted.

BRIEF DESCRIPTION OF THE DRAWINGS

FIG. 3 is a diagram showing a tire profile data structure according to an embodiment.

FIG. 9 is a block diagram of a remote computing system according to an embodiment.

FIGS. 10A and 10B are diagrams of machine learning systems according to embodiments.

DETAILED DESCRIPTION

According to embodiments, a system can include tire sensors devices that can acquire tire information for corresponding tires. Tire information can be included in a tire profile data structure can include additional tire data, including but not limited to, historical data on tire states and usage. A tire profile data structure can be periodically updated and transmitted to other vehicle systems and/or to a remote computing system via a wireless network or the like.

In some embodiments, a tire sensor device can receive tire information data from a tire according to one or more Bluetooth standards.

In some embodiments, a tire sensor device can transmit a tire profile data structure to another vehicle system according to one or more Bluetooth standards. The other vehicle system can transmit the tire profile data structure to a remote system according to another wireless standard, such as an IEEE 802.11 wireless standard and/or a cellular network standard.

In some embodiments, a tire sensor device or other vehicle system can include processing circuits that operate on tire sensor data and/or other vehicle system data, to generate additional data included in a tire profile data structure. Such processing can include aggregating data values. Such processing can also include generating derivative values, which can include, but are not limited to, wheel revolution values from acceleration sensor data and/or types of miles/kms traveled (e.g., city or highway).

Figure 1:
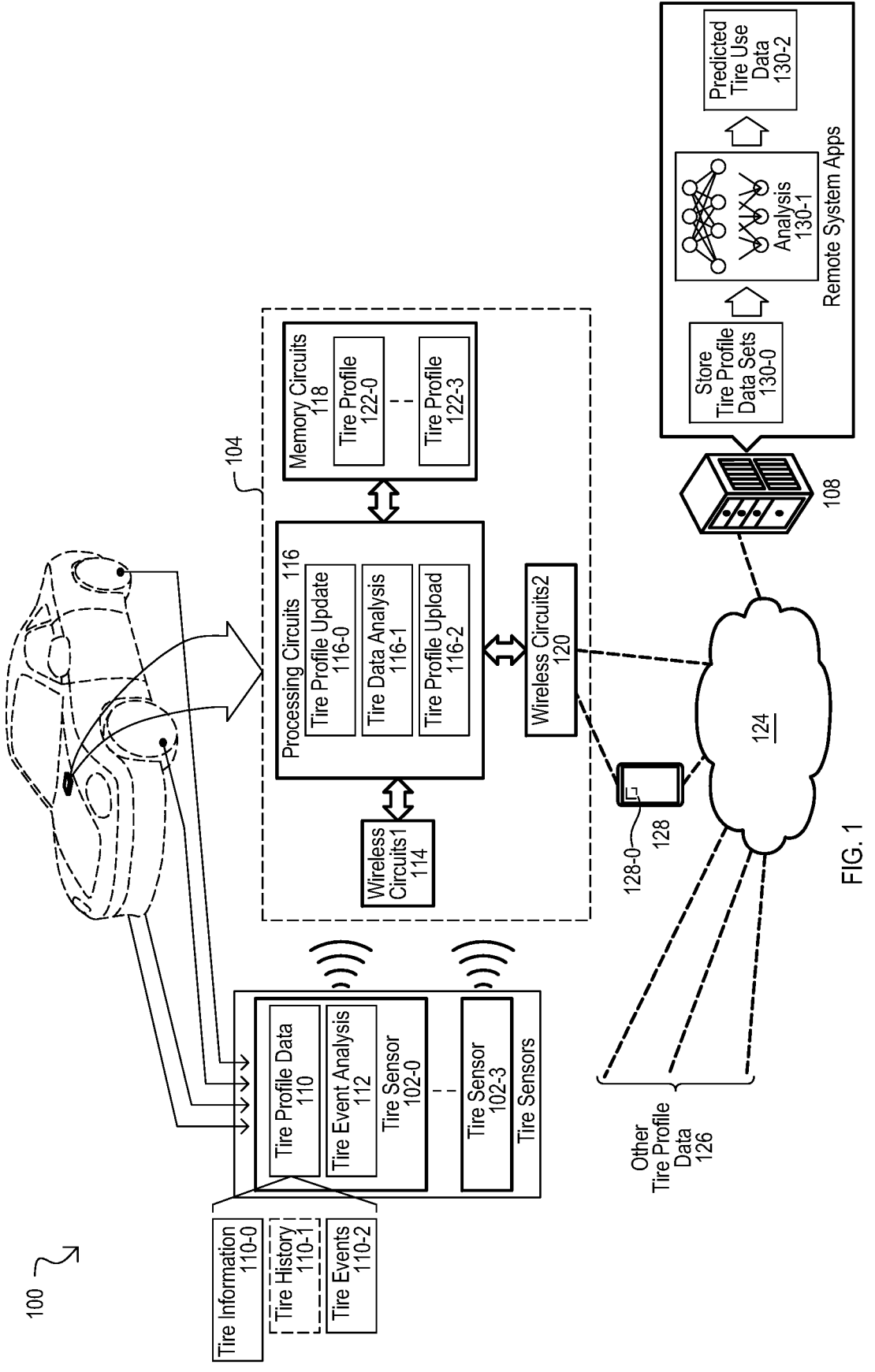
FIG. 1 is a diagram showing a system for storing and distributing tire profile data according to an embodiment.

FIG. 1 is a diagram of a system 100 according to an embodiment. A system 100 can include tire sensor devices (102-0 to 102-3), one or more vehicle systems 104, and a remote computing system 108. Each tire sensor device (102-0 to -3) can store tire profile data 110 and can execute tire event analysis 112. Tire profile data 110 can include, but is not limited to, tire information 110-0, tire history 110-1 and tire events 110-2. Tire information 110-0 can identify a tire, including but not limited to, tire manufacturer data (e.g., date manufactured, type of tire, serial number). Tire history 110-1 can include historical data regarding a tire's use. Tire events 110-2 can include events experienced by a tire, as detected by sensors. Tire event analysis 112 can be executed by processing circuits on tire sensor devices (102-0 to 102-3), and can include generating values from sensor data for the corresponding tires. Such values can be aggregate values that combine sensor readings, including sensor readings over different time periods. Each tire sensor device (102-0 to -3) can wirelessly transmit tire profile data 110 according to any suitable protocol, including but not limited to, one or more Bluetooth standards (including BLE) and/or an IEEE 802.15.4 related standards (e.g., Zigbee).

A vehicle system 104 can include first wireless circuits 114, processing circuits 116, memory circuits 118 and second wireless circuits 120. First wireless circuits 114 can receive tire profile data 110 from each tire sensor device (102-0 to -3), and provide such data to processing circuits 116. Processing circuits 116 can receive tire profile data from tire sensor devices, and store such data memory circuits 118 as tire profiles 122-0 to 122-3. In some embodiments, tire profiles (122-0 to -3) can be the same as tire profile data 110 received from tire sensor devices (102-0 to -3). However, in other embodiments tire profiles (122-0 to -3) can include additional data generated by processing circuits and/or received from other systems of a vehicle.

Processing circuits 116 can take any suitable form, including one or more processors, standard logic, custom logic, or programmable logic. Processing circuits 116 can execute tire profile update operations 116-0, tire data analysis 116-1 and tire profile upload operations 116-2. Tire profile update operations 116-0 can update tire profiles (122-0 to -3) over time. Such updates can be in response to any suitable system operations, including by not limited to, receiving new tire profile data 110 from tire sensor devices (102-0 to -3), new tire data generated by processing circuits 116 and/or new data received from other systems of a vehicle. Thus, in some embodiments, a tire profile can be a dynamic data structure, updated over a lifetime of a tire.

Tire data analysis 116-1 can include processing received tire data 110 and/or data received from other sources, to generate processed values that can be stored as part of a tire profile (122-0 to -3). Tire data analysis 116-1 can also include evaluating tire profile data 110 and/or tire profiles (122-0 to -3) for values that result in a warning or alarm for a driver of the vehicle. Tire profile upload 116-2 can include controlling second wireless circuits 120 to transmit tire profiles (112-0 to -3) from a vehicle system 104 to one or more other systems external to the vehicle, such as remote computing system 108.

Memory circuits 118 can store tire profiles (112-0 to -3). In some embodiments, memory circuits are nonvolatile, storing tire profiles (112-0 to -3) in absence of power. Second wireless circuits 120 can be controlled by processing circuits 116 to transmit tire profiles (112-0 to -3). In some embodiments, second wireless circuits 120 can be compatible with a different standard than first wireless circuits 114. Tire profiles (112-0 to -3) can be transmitted to a remote computing system 108 through a network 124 that can include a wireless network. Optionally, second wireless circuits 120 can transmit tire profiles (122-0 to -3) to a user device 128, which can forward such data to remote computing system 108 by operation of one or more applications 128-0. A network 124 can include one or more wireless networks, including the Internet.

A remote computing system 108 can receive tire profiles (112-0 to -3) from vehicle system 104 as well as tire profiles 126 from other vehicles or sources. A remote computing system 108 can store tire profile data sets 130-0 and analyze such data sets 130-1. Such analysis can include any suitable analysis, and in the embodiment shown, can include predicting tire use and/or wear 130-2 with a machine learning system.

In this way, tire profile data can be logged by a tire sensor device, periodically updated, and wirelessly distributed to other systems, including vehicle systems and/or remote computing systems.

Figure 2:
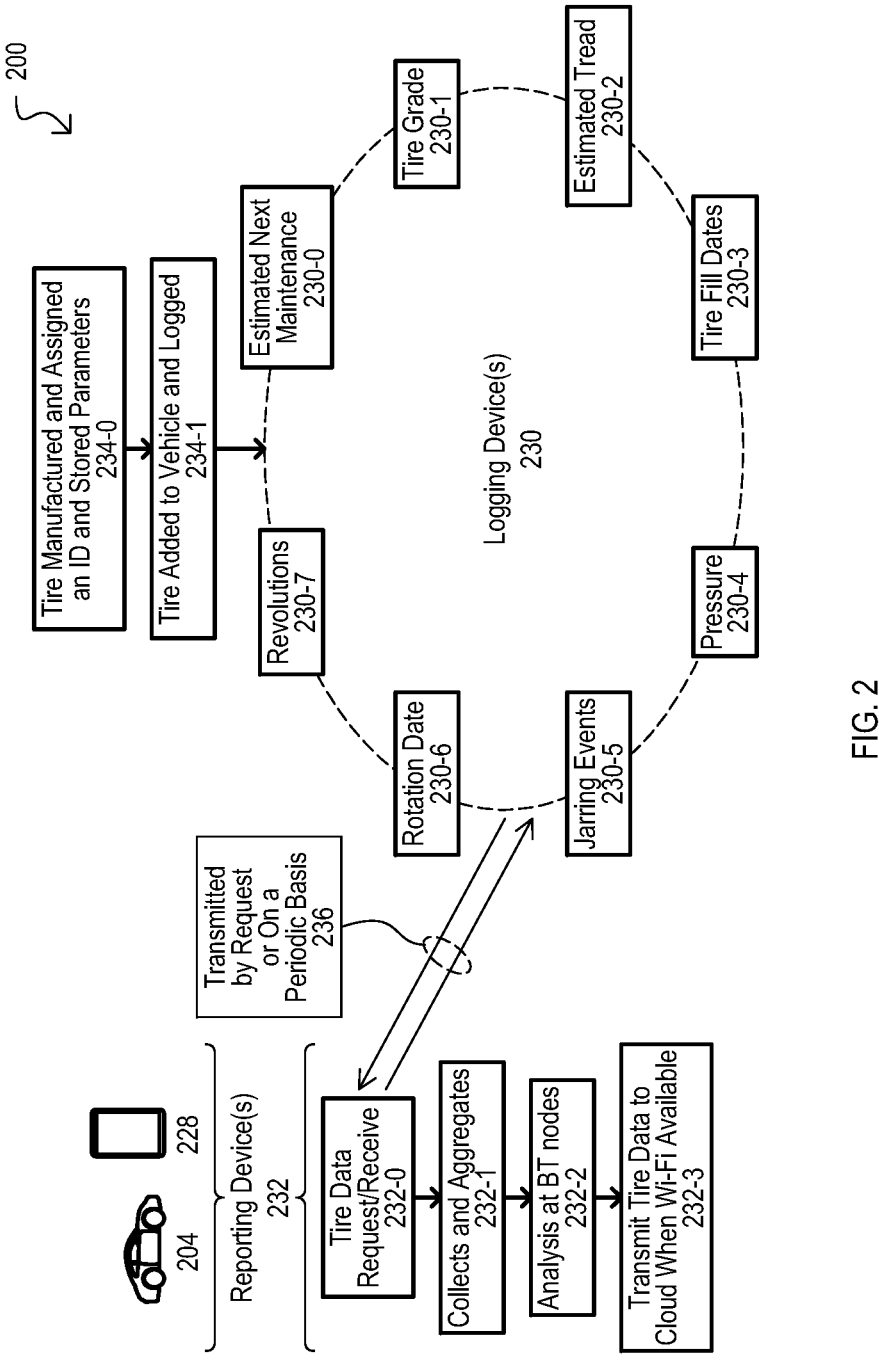
FIG. 2 is a diagram showing operations of a system according to an embodiment.

FIG. 2 is a diagram showing operations of a system 200 according to another embodiment. System operations 200 can include operations of one or more logging devices 230 and operations of one or more reporting device(s) 232. A tire can be manufactured and assigned an identification value (ID) as well as other parameters that can be stored with the tire 234-0. Such an action can include programming a wireless device included with the tire, or associated with the tire. In some embodiments such a wireless device can be separate from a tire valve assembly or included with a tire valve assembly. In still other embodiments, such data can be provided by a tire installer/seller.

Logging device(s) 230 can be a wireless devices included with or associated with a tire. Logging device(s) 230 can receive tire sensor data and include processing circuits for calculating tire profile values based on tire sensor data and/or data from other sources. In some embodiments logging device(s) 230 can be a single device (e.g., a tire sensor or other vehicle system), however in other embodiments, logging device(s) 230 can include more than one device (e.g., a tire sensor in communication with another vehicle system). A tire can be added to a vehicle and logged 234-1. Such an action can include a tire sensor device communicating with other devices of a vehicle, and/or with a tire installer. Such an action can result in an installation date and optionally, an installation position for the tire being determined. Such data can be added to a tire profile for the installed tire.

Once a tire is installed on a vehicle, logging device(s) can log and/or generate data for a tire profile. Such actions can include receiving sensor data from tire sensors, receiving data from other systems of vehicle, or analyzing or otherwise processing such data. Logged data can take any suitable form, and in the embodiment shown, can include an estimated next maintenance 230-0, determining a tire grade 230-1, estimating tread wear 230-2, determining tire fill dates 230-3, determining tire pressure 230-4, determining jarring events 230-5, determining rotation dates 230-6, and determining revolutions 230-7. Estimating a next maintenance 230-0 can include processing circuits evaluating tire state based on any suitable sensor or other data, to arrive at a recommended point in time for tire maintenance. Such an operation can include, but is not limited to, evaluating historical data for a tire (e.g., revolutions, events experienced by the tire, e.g., jarring events), filling events and levels, weather conditions, types of miles driven, tire revolutions, estimated tread wear, or tire type.

Tire grade 230-1 can include processing circuits generating a value representing a current state of a tire. A tire grading operation 230-1 can include storing and/or processing any suitable tire data, including but not limited to, tread wear and tire information from a manufacturer, such as a temperature rating value, and a traction rating value. As a tire is used, a tire grade 230-1 can be dynamically updated in response to tire events and/or history. Estimated tread 230-2 can include processing circuits calculating tread wear based on any suitable tire values, including but not limited to revolutions, tire grade and/or tire history (e.g., types of miles/kms, weather, temperature, locations driven). Estimated tread 230-2 can be used as a tread wear value used in the calculation of other logged values. In some embodiments, estimated tread 230-2 can also be updated by external data entry (e.g., a maintenance technician measurement).

Tire fill dates 230-3 can be recorded dates a tire has been filled. In some embodiments, such data can be automatically generated by a tire sensor device detecting pressure changes in a tire. However, embodiments also anticipate such data being provided by a user or "smart" filing device (e.g., a device filling a tire communicates with a tire sensor device). Tire pressure 230-4 can be periodic values read and stored by a tire sensor device and/or reported by a tire sensor device (e.g., wirelessly transmitted from a tire sensor device to another vehicle system).

Jarring events 230-5 can be generated from accelerometer readings acquired and stored by a tire sensor device and/or reported by a tire sensor device. In some embodiments, jarring events 230-5 can be generated with data from other systems of a vehicle, such as a suspension system. Rotation dates 230-6 can be generated automatically by processing circuits detecting a change in position of a tire. In some embodiments, such an action can include wireless range finding with a tire sensor device operating with other tire sensor devices or other systems of a vehicle. In addition or alternatively, such an action can include receiving data from an external source (e.g., tire rotation technician). Revolution values 230-7 can be generated by processing accelerometer readings from a tire sensor. However, alternate embodiments can include receiving data from other sources, such as wheel brake or wheel motor assemblies. It is understood that the type of logged data show in FIG. 2 is provided by way of example. One skilled the art would realize numerous other types of data can be logged.

Data logged by logging device(s) 230 can be periodically transmitted 236 to reporting device(s) 232. Such an action can include reporting device(s) requesting such logged data and/or such logged data being periodically transmitted. Further, logged data can be transmitted to more than one reporting device.

Reporting device 232 can include any suitable device, including systems of a vehicle 204 or a user device 228. Reporting device(s) 232 can include one or more devices that can request or otherwise receive logged data 232-0. Such an action can include receiving such data over wired or wireless connection. Receiving data over a wired connection can include receiving data over a vehicle bus or other wired signal path. Receiving data over a wireless connection can include generating wireless requests to one or more logging devices 230, and/or monitoring one or more channels used by logging devices 230 to transmit logged data.

Reporting device(s) 232 can collect and aggregate logged data 232-1. Such an action can include any suitable organizing of received logged data according to an application for such data. Collecting and aggregating logged data 232-1 can include, but is not limited to, organizing logged data according to date, tire, tire location and/or tire type. Reporting device(s) can also analyze logged data 232-2. In the embodiment shown, such analysis can be performed by wireless nodes, such as BT nodes. Such nodes may advantageously receive logged data from other BT transmitting devices, and include processing circuits for executing processing operations. Processing of logged data can take the form of any of those described herein, or equivalents. Further, such processing can be partial and/or distributed. That is, a portion of processing can be performed by one wireless node, and completed by one or more other wireless nodes and/or the logged data may be divided for processing among more than one wireless node, and then combined as one output data set.

Once logged data have been collected/aggregated and processed, a reporting device can transmit such data to a remote computing system 232-3. In the embodiment shown, this can include reporting devices transmitting collected, aggregated and/or analyzed data via according to one or more IEEE 802.11 wireless standards (referred to herein as Wi-Fi). However, any other suitable wireless communication can be used, including cellular networks and/or proprietary networks. In some embodiments, a remote computing device receiving such data can include one or more servers accessed by the internet (e.g., cloud computing devices).

In this way, data related to tire and tire operations can be logged, collected or aggregated and analyzed by multiple devices of vehicle system, and then transmitted to a remote computing system.

FIG. 3 is a diagram of a tire profile data structure 322 according to an embodiment. A tire profile data structure 322 can include various parameters with corresponding values. In the embodiment shown, tire profile data structure 322 can include: tire information 322-0, which can identify a particular tire; date of manufacture and date of sale 322-1 and 322-2; a current vehicle type 322-3, a current driver 322-4, a number of wheel revolutions 322-5; jarring events experienced by a tire, grouped by severity 322-6; a current tire grade 322-7 and an estimated tread amount 322-8. It is noted that while some parameters are static (e.g., tire info, manufacturing date), other parameters are dynamic (e.g., wheel revolutions, jarring events, tire grade, estimated tread), and can be generated by processing circuits.

In this way, embodiments can generate tire profile data structures that can identify a tire and include parameters that are dynamically updated over time and/or tire use.

Figure 4:
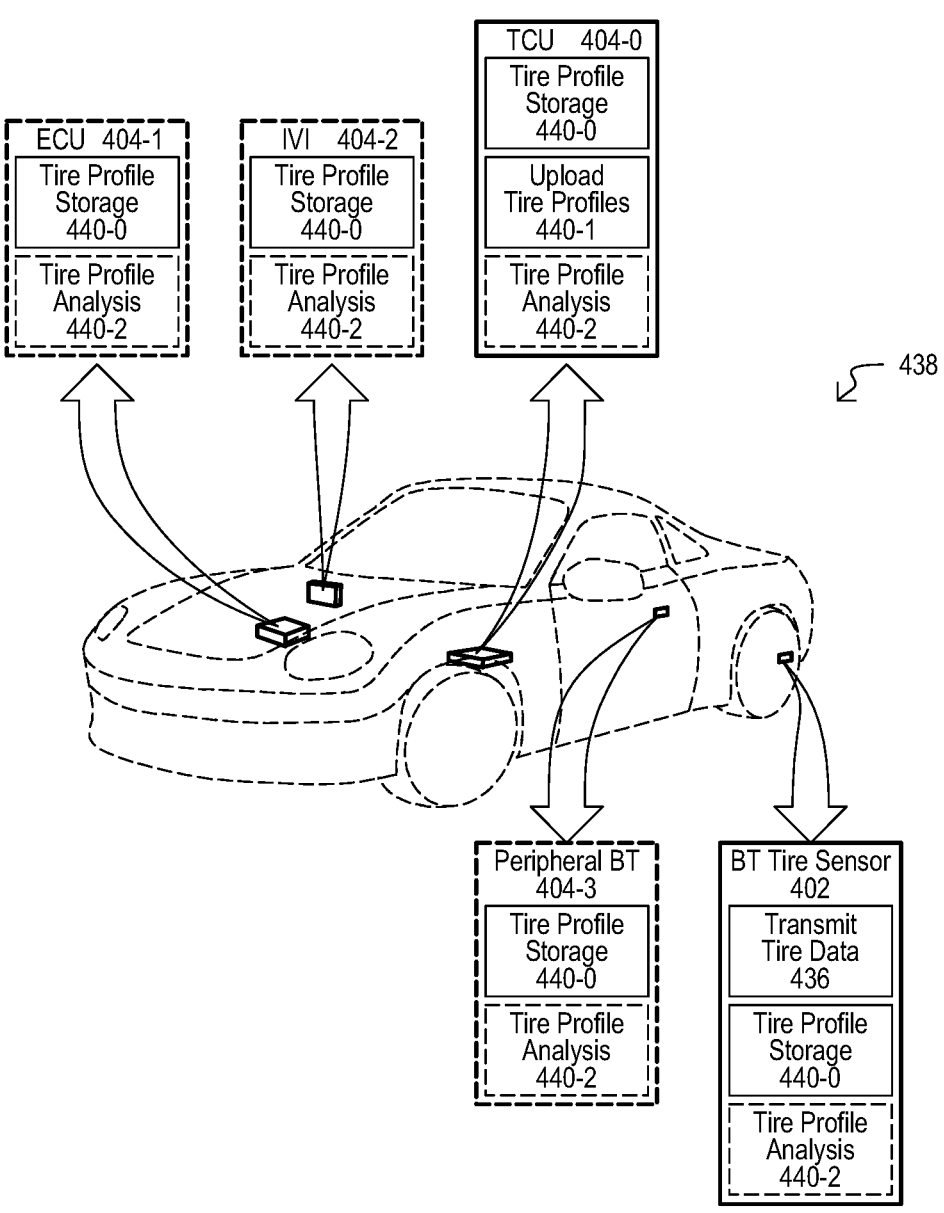
FIG. 4 is a diagram showing vehicle systems according to embodiments.

FIG. 4 is a diagram showing various system of a vehicle 438 according to an embodiment. A vehicle 438 can include a tire sensor device 402 and one or more vehicle systems 404-0 to 404-3. A tire sensor device 402 can store tire profile data 440-0 and wireless transmit tire data 436. In the embodiment shown, a tire sensor device 402 can be a BT device. Optionally, a tire sensor device 402 can execute tire profile analysis 440-2. Such an action can include processing tire and related data, as described herein or equivalents, including but not limited to collection, aggregation, and analysis of such data.

Tire data transmitted from a tire sensor device 402 can be received at a vehicle system 404-0. A vehicle system 404-0 can store tire profiles 440-0 received from other devices and systems, including from a tire sensor device 402, and can upload tire profiles to other systems 440-1 (including remote systems). Optionally, a vehicle system 404-0 can execute tire profile analysis 440-2, as described herein and equivalents. In the embodiment shown, a vehicle system 404-0 can be part of a telematics control unit (TCU).

Optionally, tire profile storage 440-0 and/or analysis 440-2 can be executed by other systems of a vehicle 438, including but not limited to, an electronic control unit (ECU) 404-1, an in-vehicle infotainment system (IVI) 404-2, or a peripheral BT unit 404-3. Other systems (404-1 to -3) can enable the distribution of tire profile data and/or analysis as described herein and equivalents.

In this way, tire profile data and analysis can be distributed over multiple systems of a vehicle.

Figure 5A:
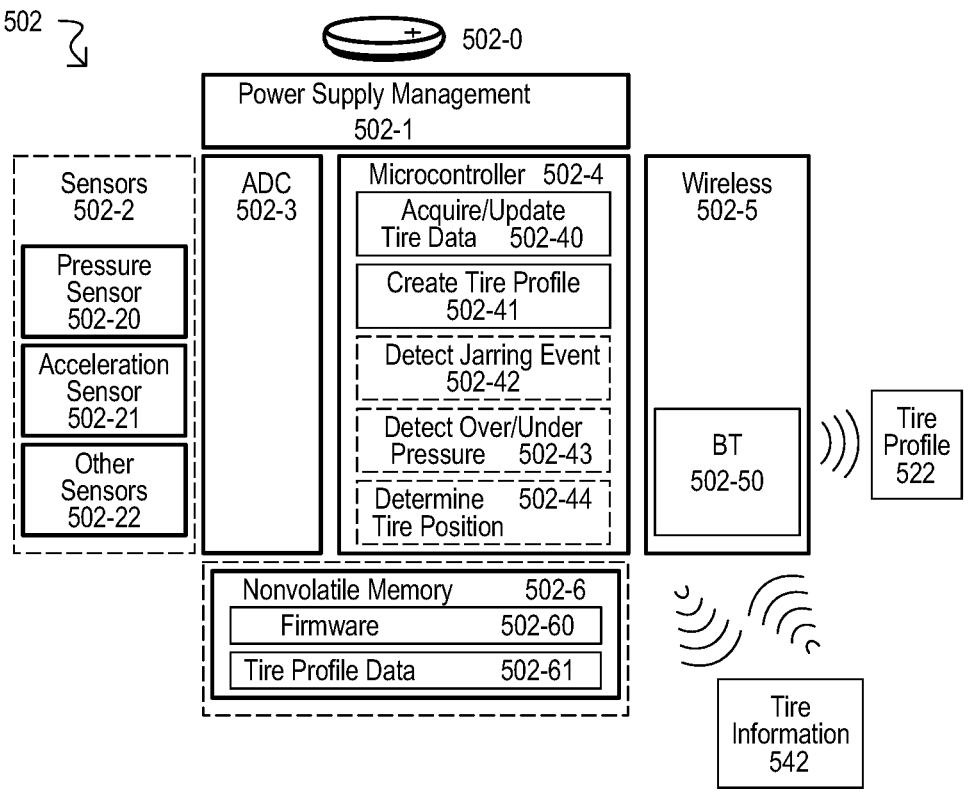
FIGS. 5A and 5B are diagrams of tire sensor devices according to embodiments.

FIG. 5A is a block diagram of a tire sensor device 502 according to an embodiment. A tire sensor device 502 can include a power supply management circuit 502-1, an analog-to-digital converter circuit (ADC) 502-3, a microcontroller 502-4, wireless circuits 502-5, and nonvolatile memory 502-6. A tire sensor device 502 can be connected to, or include sensors 502-2 and a battery 502-0. Sensors 502-2 can include any suitable sensors for detecting features of a tire, including a pressure sensor 502-20, an accelerometer 502-21, and other sensors 502-22 (such a temperature as but one of many possible examples). A battery 502-0 can enable tire sensor device to operate without a wired connection to vehicle power.

ADC 502-3 can convert analog signals received from tire sensors 502-2 into digital values, including converting tire pressure readings into digital values for inclusion in a tire profile, or for follow-on processing to generate related tire profile data (e.g., fill dates, over/under pressure events, jarring events, wheel/tire revolutions, tire position).

A microcontroller 502-4 can be programmed to execute various functions, including but not limited to, acquiring/updating tire data 502-40 and creating tire profile 502-41. Acquiring/updating tire data 502-40 can include receiving/reading sensor data, but can also include receiving data from other sources, including other vehicle systems or systems external to the vehicle. Such acquired data can then be stored as tire profile data, and then updated as new tire related data are periodically acquired. Creating a tire profile 502-41 can include establishing a data structure to store tire parameters and/or populating an existing parameter previously programmed into the device 502.

Optionally, a microcontroller 502-4 can detect jarring events 502-42, detect over and/or under pressure states 502-43, and/or determine tire position 502-44. Detecting jarring events 502-42 can include analyzing sensor readings, such as the accelerometer 502-21 and/or other vehicle sensor data, including that received from other vehicle systems. Detecting over/under pressure conditions 502-43 can include analyzing readings from pressure sensor 502-20, and storing such events with a corresponding timestamp. Determining tire position 502-44 can include executing direction finding operations with other devices (e.g., other tire sensor devices, or other vehicle systems) to determine a position of the tire. In some embodiments, determining tire position can include angle-of-arrival (AoA) and/or angle-of-departure (AoD). Jarring event data, over/under pressure data and tire position data can be stored in a tire profile data structure.

Wireless circuits 502-5 can operate according to one or more wireless standards to transmit data from and receive data at the tire sensor device 502. In the embodiment shown, wireless circuits 502-5 can include BT circuits 502-50. BT circuits 502-50 can receive and/or transmit tire information 542. Tire information can be received in any suitable manner and from any suitable source, including but not limited to another wireless device associated with a tire, another vehicle system, or a system external to a vehicle (e.g., service provider system). BT circuits 502-50 can also transmit tire profile data 522 to other vehicle systems, for distributed storage and/or processing of tire profile data.

Nonvolatile memory circuits 502-6 can store data tire profile data 502-61 accessed by and/or generated by microcontroller 502-4. Such tire profile data can be periodically updated by microcontroller 502-4. Nonvolatile memory circuits 502-6 can also include firmware 502-60, which can include instructions executable by microcontroller 502-4 to provide the various operations described. Nonvolatile memory circuits 502-6 can be integrated with a microcontroller 502-4, or can be a separate device from microcontroller 502-4.

Figure 5B:
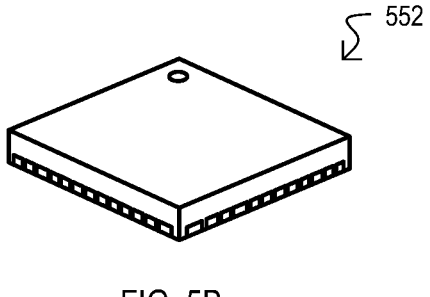

FIG. 5B is a diagram of a tire sensor device 552 according to an embodiment. A tire sensor device 552 can include circuits like those shown as 502 in FIG. 5A, and can be in the form of a single integrated circuit (IC) device. Alternate embodiments can include a different type of packaging and/or an unpackaged die attached to systems substrate in any suitable fashion.

In this way, a tire sensor device can include circuits for acquiring and updating a tire profile, and transmitting such a profile to other systems of a vehicle. In some embodiments, a tire sensor device may advantageously be included in a single IC device.

Figure 6:
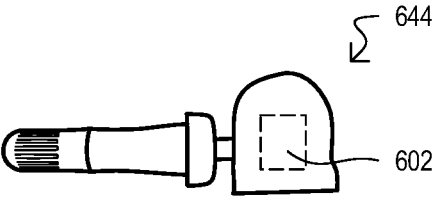
FIG. 6 is a diagram of a valve stem assembly according to an embodiment.

FIG. 6 is a diagram showing a tire valve stem assembly 644 according to an embodiment. A tire valve stem assembly 644 can include a tire sensor device 602 like that shown in FIG. 5A or 5B, or an equivalent, and can be installed in a tire of a vehicle. A tire sensor device 602 can acquire, update, and transmit tire profile data, as described herein.

In this way, a valve stem assembly can include a tires sensor device for generating and distributing tire profile data.

Figure 7:
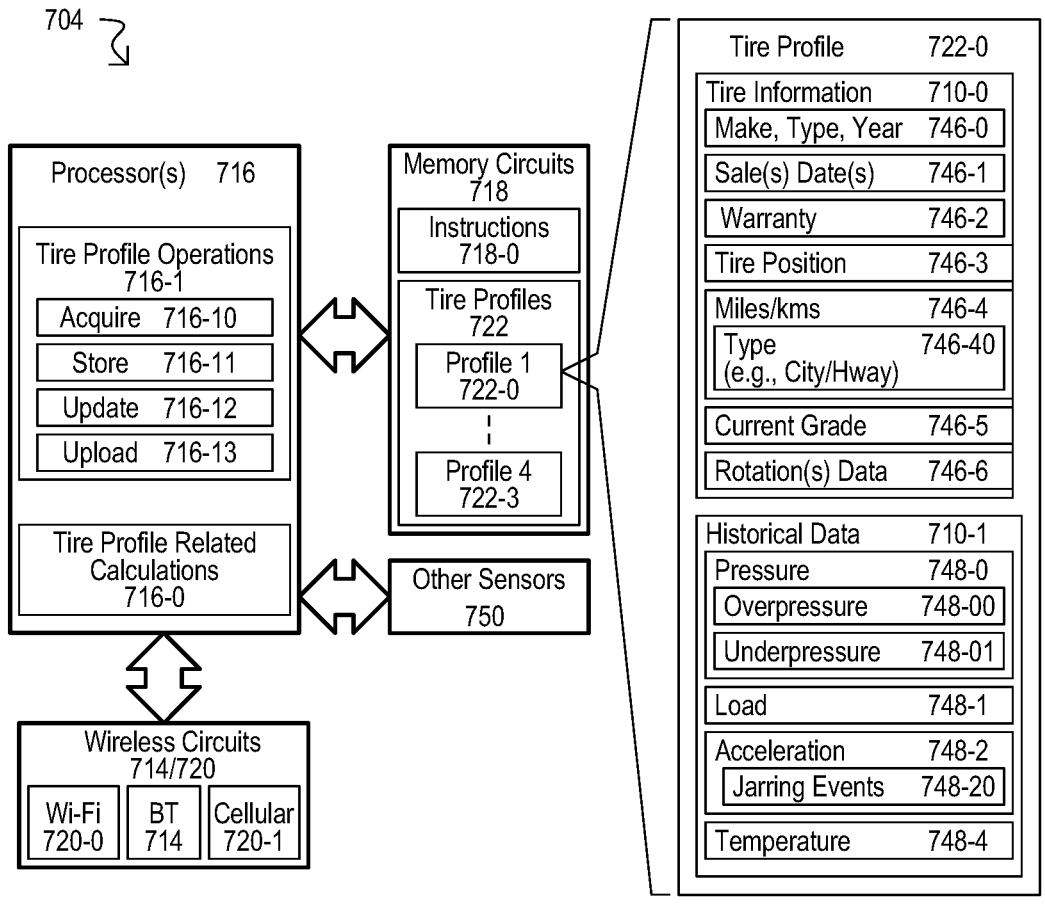
FIG. 7 is a block schematic diagram of a vehicle system according to an embodiment.

FIG. 7 is a block schematic diagram of vehicle system 704 according to an embodiment. A system 704 can include a processor circuits 716, memory circuits 718, wireless circuits 714/720, and optionally, sensor circuits 750. Processor circuits 716 can include one or more processors for executing operations related to the generation and distribution of tire profile data. Such operations can include, but are not limited to, tire profile operations 716-1 and tire profile related calculations 716-0. Tire profile operations 716-1 can include acquiring 716-10, storing 716-11, updating 716-12, and uploading 716-13 of tire profile data. Acquiring tire profile data 716-10 can include receiving data values to be added to a tire profile data structure and/or entire tire profile data structures (with or without all parameter values). Storing tire profile data 716-11 can include storing tire profile data in memory circuits, including entire tire profile data structures, or portions thereof (e.g., parameters). Updating tire profile data 716-12 can include storing new parameter data into an existing tire profile data structure in response to receiving and/or generating new parameter data. Uploading tire profile data 716-13 can include transmitting a tire profile data structure using wireless circuits 714/720.

Tire profile related calculations 716-0 can include any of those described herein or equivalents, including but not limited to, generating tire profile parameters from sensor and other data, analyzing tire profile values (including generating warnings or notices) or aggregating/collecting tire profile data.

Memory circuits 718 can store tire profiles 722 and instructions 718-0. Tire profiles 722 can include multiple tire profiles (722-0 to 722-3), each corresponding to a different tire. While FIG. 7 shows four tire profiles, alternate embodiments can include a greater number of profiles (e.g., one or more spare tires or a vehicle transporting a set of tires) or smaller number of profiles (e.g., vehicle having less than four tires). Instructions 718-0 can be executable by processor circuits 716 to provide the described operations.

FIG. 7 shows an example of a tire profile 722-0 according to an embodiment. A tire profile 722-0 can include tire information 710-0 and historical data 710-1. Tire information 710-0 can include any suitable data related to a tire, and in the embodiment shown, has make, type and year 746-0, date of sale(s) 746-1, warranty information 746-2, tire position 746-3, miles/kms on the tire 746-4, including types of miles 746-40, a current grade for the tire 746-5, and rotation date(s) a tire 746-6.

Historical data 710-1 can include data values for a tire feature over time. For example, values with different timestamps. In the embodiment shown, historical data can include pressure values 748-0, including distinguishing times of overpressure 748-00 and under pressure 748-01. Historical data 710-1 can include load values 748-1 over time. In some embodiments, load values can be associated with geographical regions (e.g., GPS coordinates). Tire acceleration data 748-2 can be logged over time, including distinguishing jarring events 742-20. Temperature 748-4 may also be logged over time.

Wireless circuits 714/720 can include circuits for transmitting and/or receiving tire profiles and related data. While wireless circuits can operate according to any suitable method, in the embodiment shown, wireless circuits 714/720 can include Wi-Fi circuits 720-0, BT circuits 714 and cellular circuits 720-1. In some embodiments, Wi-Fi circuits 720-0 and/or cellular circuits 720-1 can transmit tire profile data to remote computing systems or the like. BT circuits 714 can receive tire profile data from other systems and/or transmit tire profile data to other systems.

Other sensor circuits 750 can include sensors that can detect a state or operating environment of a vehicle that may be used in the calculation and/or analysis of tire profile related data.

In this way, a vehicle system can receive tire related profiles, update such profiles, and wirelessly transmit such tire profiles.

While systems according to embodiments can take any suitable form, some embodiments can be advantageously compact single integrated circuit devices capable of providing wireless communications according to multiple standards. Tire profile data to be distributed among vehicle systems according to one wireless standard (e.g., a relatively shorter range standard) and uploaded to networks according to another standard (e.g., a longer range standard).

Figures 8A, 8B:
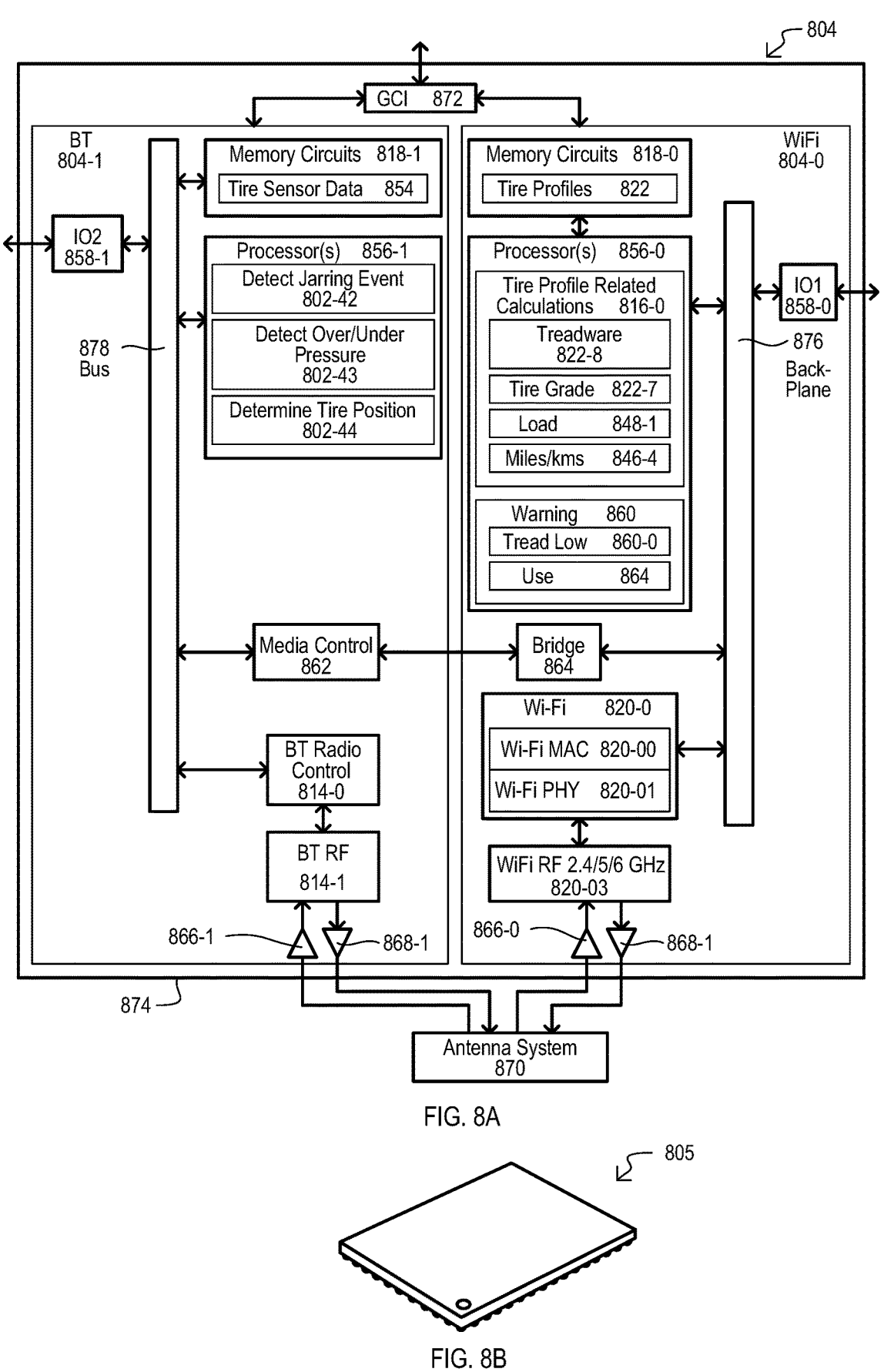
FIGS. 8A and 8B are diagrams showing tire profile processing systems according to embodiments.

FIG. 8A is a block diagram of a tire profile processing and distribution system 804 according to another embodiment. In some embodiments, a system 804 can include a single integrated circuit (IC) device 874 that can connect to an antenna system 870. IC device 874 can include a Wi-Fi section 804-0, a BT section 804-1, a coexistence interface (GCI) 872, power amplifiers (PAS) 868-0, 868-1 and low noise amplifiers (LNAs) 866-0, 866-1.

A Wi-Fi section 804-0 can include processor circuits 856-0, memory circuits 818-0, first input/output (IO) circuits 858-0, bridge control circuit 864, Wi-Fi control circuits 820-0 and Wi-Fi radio circuits 820-03 connected to one another over a backplane 876. Processor circuits 856-0 can include one or more processors that execute instructions for tire profile related operations, including but not limited to, tire profile related calculations 816-0 and warning operations 860. Tire profile related calculations 816-0 can include any of those described herein, including treadwear 822-8, tire grade 822-7, load 848-1 and miles/kms 848-4. Warning operations 860 can include generating warnings in response to tire profile data values. In the embodiment shown, such warnings can include a tread low warning 860-0 and a use warning 864. A use warning 864 can include warnings based on an undesirable position with respect to rotation, or mismatch of tire types, as but two of many possible examples.

Memory circuits 818-0 can store data accessible by a system 804, including by processor circuits 818-0, including tire profiles 822. In some embodiments, memory circuits can include nonvolatile memory circuits that store tire profiles.

First IO circuits 858-0 can enable communication with the system 804 according to any suitable interface, including a serial interface or parallel interface. In some embodiments, first IO circuits 858-0 can be compatible with one or more serial standards, including but not limited to: an SPI standard, $I^2C$ standard, USB standard, CAN bus, PCI Express and/or a proprietary standard.

Wi-Fi control circuits 820 can include circuits for performing wireless communications according to one or more IEEE 802.11 wireless standards, including those operating in the 2.4, 5 or 6 GHz band. In some embodiments, this can include Wi-Fi compatible media access control layer (MAC) circuits 820-00 and Wi-Fi compatible physical interface layer (PHY) circuits 820-01. Wi-Fi RF circuits 820-03 can include multi-band radio circuits that transmit and receive data on one or more Wi-Fi bands. In the embodiment shown, Wi-Fi RF circuits 820-03 can drive one or more PAs 868-0 and receive input signals from on one or more LNAs 866-0.

In some embodiments, when in proximity to an appropriate network, Wi-Fi section 804-0 can connect to such a network, and transmit tire profile data for reception by a remote computing system.

BT section 804-1 can provide wireless communications according to one or more BT standards. BT section 804-1 can include processor circuits 856-1, memory circuits 818-1, media control circuits 862, second IO circuits 858-1, and BT radio control circuits 814-0 connected to one another by a bus 878.

In the embodiment shown, processor circuits 856-1 can perform various operations related to tire profile data processing, including detecting jarring events 802-42, determining over/under pressure states 802-43, and determining tire position 802-44. Such operations can take the form of any of those described herein, or equivalents. Memory circuits 818-1 can store data tire sensor data 854, such as that transmitted from BT compatible tire sensor devices.

BT RF circuits 814-1 can be controlled by BT radio control circuits 814-0 and can include radio circuits to enable transmission of messages according to one or more BT standards. In the embodiment shown, BT RF circuits 814-1 can drive one or more PAs 868-1 and receive input signals from one or more LNAs 866-1.

In some embodiments, a BT section 804-1 can communicate with tire sensor devices to receive tire sensor data and/or tire profile data.

Media control circuits 862 can communicate with Wi-Fi section 804-0 using bridge control circuits 864 to control access to a transmission media (e.g., 2.4 GHZ band). In some embodiments, such a communication path can be used to transfer data between processor circuits 856-0 and 856-1. Second IO circuits 858-1 can enable communication with system 804 according to any of the embodiments described herein or equivalents.

Wi-Fi section 804-0 and BT section 804-1 can be in communication with a coexistence interface 872. A coexistence interface 872 can enable Wi-Fi section 804-0 and BT section 804-1 to interface with other wireless systems, such as cellular network systems, including but not limited to 3G, 8G, LTE and 5G networks. By way of such an interface, a system 804 can transmit tire profiles over such other wireless system(s).

In some embodiments, a BT section 804-1 can be in communication with BT based tire sensors to receive tire information and/or tire profile data. Such data can be processed by BT processor circuits 856-1 and/or provided to Wi-Fi processor circuits 856-0 for processing. In this way, processing of tire profile data can be split between different processor circuits of same device.

FIG. 8B shows a packaged single chip system 805 which can include a profile based tire filling system as described herein, or equivalents. In some embodiments, a system 805 can include those circuits shown in FIG. 8A.

In this way, a system can include a single integrated circuit device with different wireless circuits for receiving, processing, and transmitting tire profile data.

FIG. 9 is a block diagram of a remote computing system 908 according to an embodiment. A remote computing system 908 can include a network IF 908-0, a processing system 908-1, and a memory system 908-2. A network interface 908-0 can receive tire profiles 922-0 to 922-n from various vehicles over a wireless network. Optionally, a network interface can receive tire related data 954-0 to 954-k, and can transmit warning/notice messages 980-0 to 980-1.

A processing system 908-1 can execute various operations, including but not limited to, storing/updating tire profiles 908-10 and analyzing tire profiles 908-11. Storing and updating tire profiles 908-10 can include processing received wireless messages to extract tire profiles and store them in memory system 908-2. Such tire profiles can then be updated, as new, updated tire profiles are received at network IF 908-0. Analyzing tire profile data 908-11 can include processing such data in any suitable way, including but not limited to predicting trends in tire use, including predicting maintenance trends.

Optionally, a processing system 908-1 can include processing tire data 908-12. Such an operation can include processing tire data (e.g., 954-0 to -k) to generate values for a tire profile (e.g., parameters), as described for herein or an equivalent. That is, in some embodiments, a processing tire related data for a tire profile can be distributed over processing circuits in a vehicle as well as processing circuits of a remote system (e.g., a server).

Optionally, a processing system 908-1 can generate notices or warnings 908-13. Such operations can include analyzing tire profile data and generating messages for transmission to vehicles (980-0 to -I) over network IF 908-0. Such notices/warnings (980-0 to -I) can be based in established limits (e.g., tread wear limits) and/or can be predictive (e.g., suggested actions based on trends or inferred results).

A memory system 908-2 can provide memory of any suitable type to a processing system 908-1. A memory system 908-2 can store tire profiles 922 and optionally tire data 954.

In this way, a remote computing system can include a processing system that aggregates and analyzes tire profile data to predict tire use and behavior trends.

FIGS. 10A and 10B are diagrams of a machine learning system 1008-0/1008-1 that can generate tire use related notices and/or warnings. FIG. 10A shows a system 1008-0 that can include a trainable statistical model 1008-00, error function 1008-01, model adjust 1008-02 and training data 1082. A trainable statistical model 1008-00 can include any suitable model including an artificial neural network. An error function 1008-01 can determine an error between training data input and training output. A model adjust 1008-02 can adjust model 1008-00 in response to error data 1084. A model adjust 1008-02 can include any suitable machine learning operation (e.g., back propagation of neuron weights). Training data 1082 can include tire profile parameters 1082-0 and corresponding tire life and/or failure events 1082-1. Tire profile parameters 1082-0 can include any of those described herein, or equivalents. Life/failure events 1082-1 can correspond to tire profile parameters. In some embodiments, training data 1082 can be data for a same type or class of tire. In some embodiments, such training data can be logged or acquired at a final disposition point for a tire.

FIG. 10B is a diagram of a trained system 1008-1 according to an embodiment. A system 1008-1 can be implemented on a vehicle system and/or a remote computing system. A system 1008-1 can include a trained statistical model 1008-10, which can be a model like that shown in FIG. 10A, after the model has been trained with the training data. In response to tire profile data 1022, a trained model 1008-10 can generate (e.g., infer) a lifetime and/or possible failure for a tire 1086. From such generated data, a warning and/or notice 1080 can be generated.

In this way, machine learning can be used to generate warning related to tire use based on tire profile data.

While embodiments can include the various methods described in conjunction with systems and devices described herein, additional methods will now be described with reference to flow diagrams.

Figure 11:
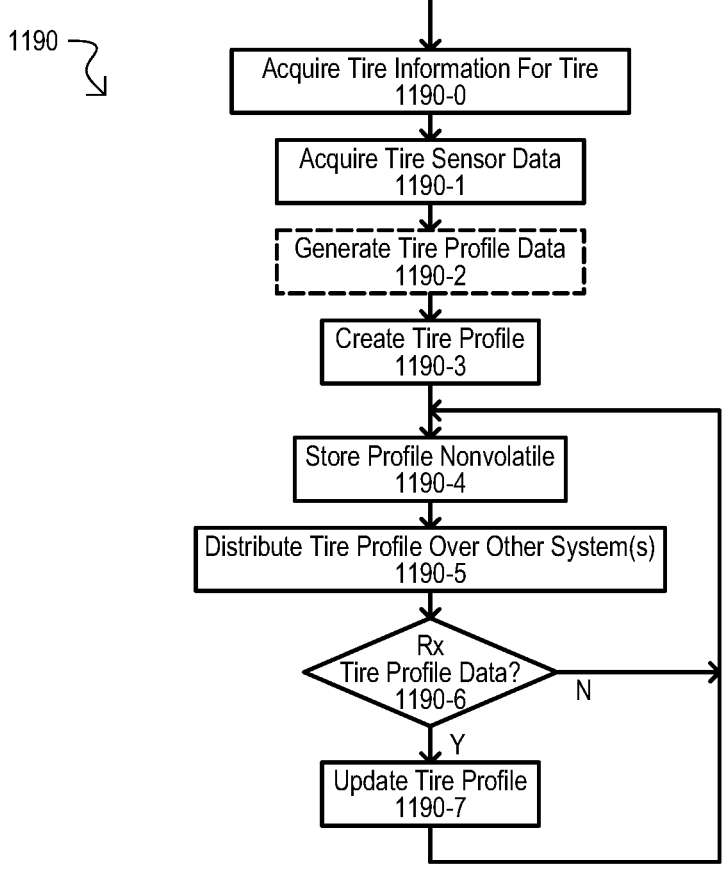
FIG. 11 is a flow diagram of a method according to an embodiment.

FIG. 11 is a flow diagram of a method 1190 according to an embodiment. A method 1190 can include acquiring tire information for a tire 1190-0. Such an action can include, but is not limited to, a vehicle system receiving tire information from a tire itself (e.g., the tire includes its own wireless device, or wireless readable device) and/or such data being provided by another source (e.g., technician). Tire sensor data can be acquired 1190-1. Such an action can include acquiring tire sensor data as described herein or equivalents. Optionally, a method 1190 can include generating tire profile data 1190-2. Such an action can include processing tire sensor data and/or data received from other sources, to generate parameters for a tire profile. A method 1190 can include creating a tire profile 1190-3. In some embodiments, such an action can include creating a data structure that includes tire parameter identifiers (e.g., "Tire Grade") and their corresponding value (e.g., "B−").

A tire profile can be stored in a nonvolatile manner 1190-4. Such an action can include storing tire profile data such that the data are preserved in the absence of power. A tire profile can be distributed over one or more other systems 1190-5. Such an action can include transmitting tire profiles, or portions thereof, for storage in other systems. Such another system can be a system of a same vehicle and/or a remote computing system (e.g., server).

A method 1190 can determine if tire profile data is received 1190-6. Such an action can include receiving a tire profile and/or parameters for a tire profile. Such data can be different or the same as an existing tire profile. Such tire profile data can be received automatically or in response to a request. If tire profile data is not received (N from 1190-6), a method can continue store and distribute a tire profile (1190-4/5). If tire profile data is received (Y from 1190-6), a method can update a tire profile 1190-7. Such an action can include over-writing and existing tire profile with a received tire profile or can include updating only a subset of parameters in a tire profile.

In this way, a tire profile can be created, distributed over more than one system, and periodically updated.

Figure 12:
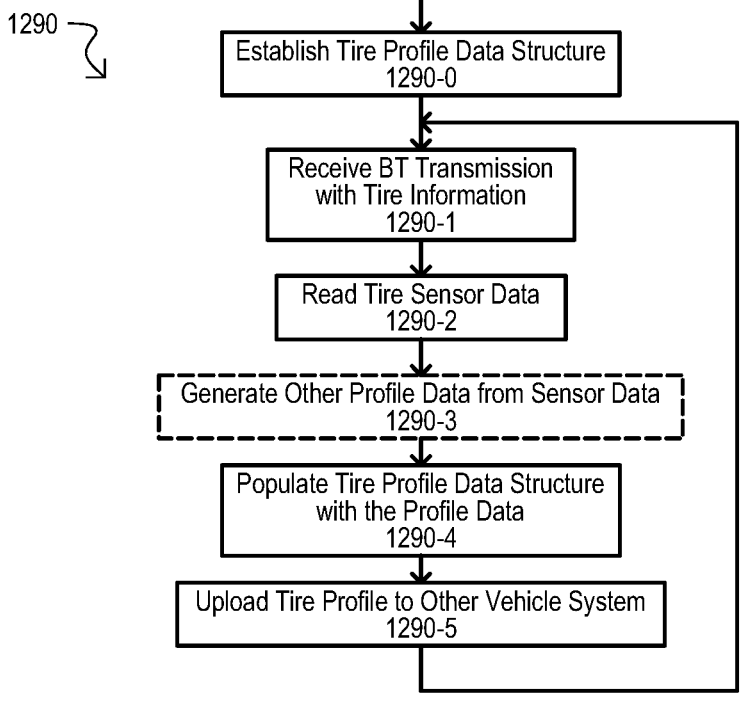
FIG. 12 is a flow diagram of a method according to another embodiment.

FIG. 12 shows a method 1290 according to another embodiment. In some embodiments, a method 1290 can be executed by a tire sensor device. A method 1290 can include establishing a tire profile data structure 1290-0. Such an action can include, but is not limited to, a tire profile data structure being programmed into a device by a manufacturer, or created by processing circuits of a device.

A method 1290 can include receiving a BT transmission with tire information 1290-1. Such an action can include, but is not limited to, receiving a BT transmission from a tire or from an external source. Tire information can identify a tire, as described herein and equivalents. Tire sensor data can be read 1290-2. In some embodiments, such an action can include a tire sensor device reading tire sensors that monitor tire state (e.g., pressure, acceleration, temperature). Optionally, a method 1290 can include generating other profile data from sensor data 1290-3.

A method 1290 can include populating a tire profile data structure with profile data 1290-4. Such an action can include storing parameter values in a tire profile data structure. This can include parameter values corresponding to tire sensor data, as well as parameters generate from tire sensor data. A tire profile can be uploaded to one or more other vehicle systems 1290-5. Such an action can include wirelessly transmitting a tire profile according to a BT or other standard.

In this way, tire sensor data can be received via BT transmissions, a tire profile can be populated with profile data (e.g., parameters), and the tire profile can be transmitted to another vehicle system.

Figure 13:
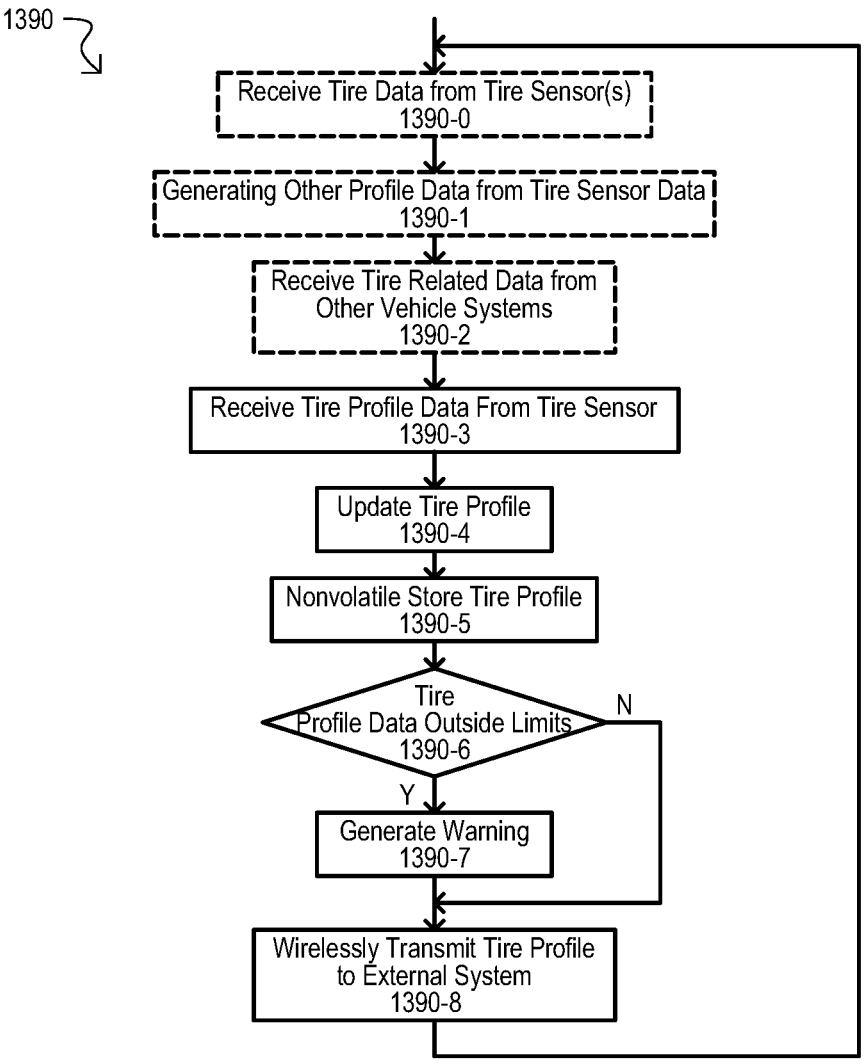
FIG. 13 is a flow diagram of a method according to a further embodiment.

FIG. 13 is a flow diagram of a method 1390 according to another embodiment. In some embodiments, a method 1390 can be executed by a vehicle system in communication with tire sensor devices. Optionally, a method can include receiving tire data from tire sensors 1390-0 and generating other profile data from tire sensor data 1390-1. Such action can include those describe for FIG. 12. Also optionally, a method 1390 can include receiving tire related data from other vehicle systems 1390-2. Such other sensor data can be included in a tire profile data, or used to generate data for a tire profile (e.g., GPS data, brake/motor data, driver ID data).

A method 1390 can also include receiving tire profile data from a tire sensor 1390-3. In some embodiment, such an action can include receiving a transmission from a BT tire sensor device. A tire profile can be updated 1390-4. Such an action can include any of those described in FIG. 11, or equivalents. A tire profile data can be stored in a nonvolatile memory 1390-5.

A method 1390 can also include determining if any tire profile data are outside of a limit 1390-6. If a tire profile data is outside of a limit (Y from 1390-6), a method can generate a warning 1390-7. Such an action can include generating a message to inform a vehicle occupant of a tire state that may need maintenance or some other action. A method 1390 can also wirelessly transmit a tire profile to a location external to a system 1390-8. Such an action can include transmitting a tire profile to a server system, or the like, over a wireless network.

In this way, tire profile data can be received from tire sensors, updated periodically, stored in a nonvolatile fashion, and then wirelessly transmitted to an external system.

Embodiments can include methods, devices and systems can include wirelessly receiving tire information at a tire sensor device; acquiring sensor data with at least the tire sensor device; storing at least the tire information and sensor data in a tire profile data structure; periodically transmitting the tire profile data structure from the tire sensor device according to at least one wireless standard; and in response to changes in a state of the tire, updating the tire profile data structure. The tire information can identify the tire.

Embodiments can include methods, devices and systems having wireless circuits compatible with at least one wireless standard and configured to receive tire information that identifies a tire, receive tire sensor data indicating a state of the tire, and periodically transmit a tire profile data structure. Processing circuits can be configured to update the tire profile data structure in response to at least tire sensor data. Nonvolatile memory circuits can be configured to store the tire profile data structure. The tire profile data structure can include at least the tire information.

Embodiments can include methods, devices and systems having a first device with first nonvolatile memory circuits configured to store a tire profile data structure; first processing circuits configured to update data in the tire profile data structure in response to receiving update data; first wireless circuits compatible with at least a first standard and configured to transmit the tire profile data structure from the first device; and an antenna system coupled to the wireless circuits. A tire profile data structure can include at least tire information identifying a tire.

Methods, devices, and systems according to embodiments can include wirelessly receiving tire information via wireless communications compatible with at least one Bluetooth standard.

Methods, devices, and systems according to embodiments can include periodically acquiring sensor data over time; aggregating sensor data of different time to generate aggregated data; and storing the aggregated data in the tire profile data structure.

Methods, devices, and systems according to embodiments can include processing tire sensor data with processing circuits of the tire sensor to generate processed data; and storing the processed data in the tire profile data structure.

Methods, devices, and systems according to embodiments can include periodically generating a tire grade value that changes with tire use.

Methods, devices, and systems according to embodiments can include, in response to the sensor data being outside a predetermined limit, generating a warning.

Methods, devices, and systems according to embodiments can include a tire being associated with a vehicle; transmitting the tire profile data structure from the tire sensor to a system of the vehicle; and storing the tire profile data structure in nonvolatile memory of the system.

Methods, devices, and systems according to embodiments can include wirelessly transmitting the tire profile data structure from the system to a server system over a wireless network.

Methods, devices, and systems according to embodiments can include receiving a plurality of tire profile data structures for tires of different vehicles; and processing the plurality of tire profile data structure to predict times for tire maintenance.

Methods, devices, and systems according to embodiments can include wireless circuits, processing circuits, and nonvolatile memory circuits formed in a same integrated circuit substrate.

Methods, devices, and systems according to embodiments can include a first device comprising a tire sensor for a tire; and first wireless circuits configured to receive the tire information.

Methods, devices, and systems according to embodiments can include a first device comprising a vehicle system; and first wireless circuits that transmit tire profile data can be compatible with at least one standard selected from the group of: an IEEE 802.11 wireless standard and a cellular network standard.

Methods, devices, and systems according to embodiments can include first processing circuits configured to receive tire sensor data, process the tire sensor data to generate processed data, and store the processed data in the tire profile data structure.

Methods, devices, and systems according to embodiments can include first processing circuits configured to generate a warning message in response to data of the tire profile data structure being outside of a predetermined limit.

Methods, devices, and systems according to embodiments can include a second device comprising second nonvolatile memory circuits configured to store the tire profile data structure; second wireless circuits compatible with at least the first standard and configured to receive the tire profile data structure from the first device; and third wireless circuits compatible with at least a second standard and configured to transmit the tire profile data structure from the second device.

Methods, devices, and systems according to embodiments can include a server system configured to receive the tire profile data structure, and other tire profile data structures over at least one wireless network.

It should be appreciated that reference throughout this specification to "one embodiment" or "an embodiment" means that a particular feature, structure, or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
wirelessly receiving tire information at a tire sensor device;
acquiring sensor data with at least the tire sensor device;
storing at least the tire information and sensor data in a tire profile data structure;
periodically transmitting the tire profile data structure from the tire sensor device according to at least one wireless standard; and
in response to changes in a state of the tire, updating the tire profile data structure; wherein
the tire information identifies the tire.

2. The method of claim 1, wherein wirelessly receiving tire information includes receiving wireless communications compatible with at least one Bluetooth standard.

3. The method of claim 1, wherein acquiring the sensor data includes
periodically acquiring sensor data over time;
aggregating sensor data of different times to generate aggregated data; and
storing the aggregated data in the tire profile data structure.

4. The method of claim 1, further including:
processing tire sensor data with processing circuits of the tire sensor to generate processed data; and
storing the processed data in the tire profile data structure.

5. The method of claim 4, wherein processing tire sensor data includes periodically generating a tire grade value that changes with tire use.

6. The method of claim 1, further including in response to the sensor data being outside a predetermined limit, generating a warning.

7. The method of claim 1, further including:
the tire is associated with a vehicle;
transmitting the tire profile data structure from the tire sensor to a system of the vehicle; and
storing the tire profile data structure in nonvolatile memory of the system.

8. The method of claim 7, further including wirelessly transmitting the tire profile data structure from the system to a server system over a wireless network.

9. The method of claim 1, further including:
receiving a plurality of tire profile data structures for tires of different vehicles; and
processing the plurality of tire profile data structures to predict times for tire maintenance.

10. A device, comprising:
wireless circuits compatible with at least one wireless standard and configured to
receive tire information that identifies a tire,
receive tire sensor data indicating a state of the tire, and
periodically transmit a tire profile data structure;
processing circuits configured to update the tire profile data structure in response to at least tire sensor data; and
nonvolatile memory circuits configured to store the tire profile data structure; wherein
the tire profile data structure includes at least the tire information.

11. The device of claim 10, wherein the at least one standard is a Bluetooth standard.

12. The device of claim 10, wherein
the processing circuits are configured to
process the tire sensor data to generate processed data, and
store the processed data in the tire profile data structure.

13. The device of claim 10, wherein the wireless circuits, the processing circuits, and nonvolatile memory circuits are formed in a same integrated circuit substrate.

14. A system, comprising:
a first device that includes
first nonvolatile memory circuits configured to store a tire profile data structure;
first processing circuits configured to update data in the tire profile data structure in response to receiving update data;
first wireless circuits compatible with at least a first standard and configured to transmit the tire profile data structure from the first device; and
an antenna system coupled to the wireless circuits; wherein
tire profile data structure includes at least tire information identifying a tire.

15. The system of claim 14, wherein:
the first device comprises a tire sensor for a tire; and
the first wireless circuits are configured to receive the tire information.

16. The system of claim 14, wherein:
the first device comprises a vehicle system; and
the at least one standard is selected from the group of: an IEEE 802.11 wireless standard and a cellular network standard.

17. The system of claim 14, wherein:
the first processing circuits are configured to
receive tire sensor data,
process the tire sensor data to generate processed data, and
store the processed data in the tire profile data structure.

18. The system of claim 14, wherein the first processing circuits are configured to generate a warning message in response to data of the tire profile data structure being outside of a predetermined limit.

19. The system of claim 14, further including:
a second device comprising
second nonvolatile memory circuits configured to store the tire profile data structure;

second wireless circuits compatible with at least the first standard and configured to receive the tire profile data structure from the first device; and third wireless circuits compatible with at least a second standard and configured to transmit the tire profile data structure from the second device.

20. The system of claim 14, further including a server system configured to receive the tire profile data structure, and other tire profile data structures over at least one wireless network.

* * * * *